US012662567B2

(12) United States Patent
Ikeda et al.

(10) Patent No.: US 12,662,567 B2
(45) Date of Patent: Jun. 23, 2026

(54) RESIN COMPOSITION, CURED PRODUCT, SEALING MATERIAL, ADHESIVE, INSULATING MATERIAL, COATING MATERIAL, PREPREG, MULTILAYERED BODY, AND FIBER-REINFORCED COMPOSITE MATERIAL

(71) Applicant: Mitsubishi Gas Chemical Company, Inc., Tokyo (JP)

(72) Inventors: Kousuke Ikeda, Niigata (JP); Yoshihiro Yasuda, Niigata (JP); Masayuki Katagiri, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 518 days.

(21) Appl. No.: 18/181,472

(22) Filed: Mar. 9, 2023

(65) Prior Publication Data

US 2023/0383047 A1 Nov. 30, 2023

(30) Foreign Application Priority Data

May 27, 2022 (JP) ................................ 2022-086558
Jul. 11, 2022 (JP) ................................ 2022-111281

(51) Int. Cl.

| | |
|---|---|
| ***C08G 18/58*** | (2006.01) |
| ***C08G 18/10*** | (2006.01) |
| ***C08J 5/24*** | (2006.01) |

(52) U.S. Cl.

CPC ........... *C08G 18/584* (2013.01); *C08G 18/10* (2013.01); *C08J 5/249* (2021.05); *C08G 2150/00* (2013.01); *C08G 2170/00* (2013.01); *C08G 2190/00* (2013.01); *C08G 2330/00* (2013.01); *C08J 2375/04* (2013.01)

(58) Field of Classification Search

CPC .............................. C08G 18/584; C08G 18/10
See application file for complete search history.

(56) References Cited

U.S. PATENT DOCUMENTS

| | | | | |
|---|---|---|---|---|
| 2012/0309923 | A1* | 12/2012 | Ogawa | C08G 73/0655 528/99 |
| 2014/0083567 | A1* | 3/2014 | Hamagawa | B23K 35/3613 148/23 |
| 2016/0262263 | A1* | 9/2016 | Katagiri | C08L 63/00 |
| 2016/0340470 | A1* | 11/2016 | Kushihara | C08L 63/00 |
| 2020/0413542 | A1 | 12/2020 | Ooyama et al. | |

FOREIGN PATENT DOCUMENTS

| | | | |
|---|---|---|---|
| CN | 110591622 | A | 12/2019 |
| CN | 112048271 | A | 12/2020 |
| JP | 2011-016967 | A | 1/2011 |
| JP | 2013-151700 | A | 8/2013 |
| JP | 2017-132896 | A | 8/2017 |
| JP | 2021-195390 | A | 12/2021 |

OTHER PUBLICATIONS

International Search Report and Written Opinion for PCT/JP2023/008298, mailed May 16, 2023 (9 pages).
EPO; Application No. 23160235.0; Extended European Search Report dated Sep. 28, 2023, 10 pages.

* cited by examiner

*Primary Examiner* — Michael L Leonard
(74) *Attorney, Agent, or Firm* — Fitch, Even, Tabin & Flannery LLP

(57) ABSTRACT

Provided is a resin composition comprises a cyanate ester compound (A), an amine adduct compound (B) and a borate ester (C).

24 Claims, No Drawings

RESIN COMPOSITION, CURED PRODUCT, SEALING MATERIAL, ADHESIVE, INSULATING MATERIAL, COATING MATERIAL, PREPREG, MULTILAYERED BODY, AND FIBER-REINFORCED COMPOSITE MATERIAL

CROSS-REFERENCE TO RELATED APPLICATIONS

This application claims priority under 35 U.S.C 119 to Japanese Patent Application No. 2022-086558 filed on May 27, 2022 and Japanese Patent Application No. 2022-111281 filed on Jul. 11, 2022. The above applications are hereby expressly incorporated by reference, in its entirety, into the present application.

FIELD OF THE INVENTION

The present invention relates to a resin composition, a cured product, a sealing material, an adhesive, an insulating material, a coating material, a prepreg, a multilayered body, and a fiber-reinforced composite material. In particular, the present invention relates to a resin composition comprising a cyanate ester compound.

BACKGROUND OF THE INVENTION

A cyanate ester compound is conventionally known as a thermosetting resin that foams a triazine ring during curing. A cured product obtained from a cyanate ester has excellent properties such as high glass transition temperature, low dielectric constant and dielectric loss tangent, and excellent electrical insulation properties and flame retardancy. Accordingly, a cyanate ester compound is widely used as an electrical or electronic material, a structural composite material, an adhesive, and a raw material for various functional polymer materials (Patent Literature 1).

CITATION LIST

Patent Literature

[Patent Literature 1] Japanese Patent Laid-Open No. 2021-195390

As described above, a resin composition comprising a cyanate ester compound has been studied. In recent years, the demand thereof has been expanded. For example, use as aerospace material may be expected.

On the other hand, a resin composition comprising a cyanate ester compound is required to be capable of storing at normal temperature from the viewpoint of handling and streamlined distribution, and desired to have good curability at a specified temperature or below in particular from the viewpoint of improvement in productivity. In particular, a resin composition for prepregs is required to have latency (for example, stability of resin composition at about 80° C. or less and curability of resin composition in the range of about 100 to 185° C.). Further, it is required that the heat resistance inherent to the resin composition comprising a cyanate ester compound is not negatively affected.

An object of the present invention is to solve the problem, that is, to provide a resin composition having excellent latency while maintaining excellent heat resistance, and a cured product, a sealing material, an adhesive, an insulating material, a coating material, a prepreg, a multilayered body, and a fiber-reinforced composite material.

SUMMARY OF THE INVENTION

Based on the above problem, as a result of study by the present inventor, it has been found that the problem can be solved by adding an amine adduct compound and a borate ester to a cyanate ester compound.

Specifically, the problem has been solved by the following means.

<1> A resin composition comprising a cyanate ester compound (A), an amine adduct compound (B), and a borate ester (C).

<2> The resin composition according to item <1>, wherein the cyanate ester compound (A) comprises at least one selected from the group consisting of a compound represented by the following formula (I) and a compound represented by the following formula (II):

(I)

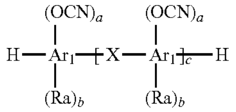

wherein each of $Ar_1$ independently represents an aromatic ring, each of Ra independently represents any one of a hydrogen atom, an alkyl group having 1 to 6 carbon atoms, an alkenyl group having 2 to 6 carbon atoms, an aryl group having 6 to 12 carbon atoms and an alkoxy group having 1 to 4 carbon atoms, the alkyl group or the aryl group in Ra optionally has a substituent, a represents the number of cyanate groups bonded to $Ar_1$, being each independently an integer of 1 to 3, b represents the number of Ra bonded to $Ar_1$, being each independently a number obtained by subtracting (a+2) from the number of substitutable substituents of $Ar_1$, c is an integer of 1 to 50, each of X independently represents any one of a single bond, a divalent organic group having 1 to 50 carbon atoms, a sulfonyl group ($-SO_2-$), a divalent sulfur atom ($-S-$), and a divalent oxygen atom ($-O-$):

(II)

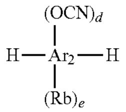

wherein $Ar_2$ represents an aromatic ring, each of Rb independently represents any one of a hydrogen atom, an alkyl group having 1 to 6 carbon atoms, an aryl group having 6 to 12 carbon atoms, and an alkoxy group having 1 to 4 carbon atoms, the alkyl group or aryl group in Rb optionally has a substituent, d represents the number of cyanate groups bonded to $Ar_2$, being an integer of 2 to 3, and e represents the number of Rb bonded to $Ar_2$, being a number obtained by subtracting (d+2) from the number of substitutable substituents of $Ar_2$.

<3> The resin composition according to item <2>, wherein each of X independently represents a divalent linking group selected from the group consisting of the following formulas (III) to (XIV):

(III)

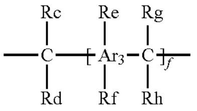

wherein each of $Ar_3$ independently represents an aromatic ring, each of Rc, Rd, Rg and Rh independently represents a hydrogen atom, an alkyl group having 1 to 6 carbon atoms, or an aryl group having 6 to 12 carbon atoms, the alkyl group or the aryl group in Rc, Rd, Rg and Rh optionally has a substituent, each of Re and Rf independently represents any one of a hydrogen atom, an alkyl group having 1 to 6 carbon atoms, an aryl group having 6 to 12 carbon atoms and an alkoxy group having 1 to 4 carbon atoms, the alkyl group or the aryl group in Re and Rf optionally has a substituent, and f represents an integer of 0 to 5;

(IV)

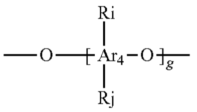

wherein each of $Ar_4$ independently represents an aromatic ring, each of Ri and Rj independently represents any one of a hydrogen atom, an alkyl group having 1 to 6 carbon atoms, an aryl group having 6 to 12 carbon atoms, and an alkoxy group having 1 to 4 carbon atoms, the alkyl group or aryl group in Ri and Rj optionally has a substituent, and g represents an integer of 0 to 5;

(V)

—O—

(VI)

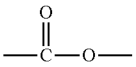

(VII)

—S—

(VIII)

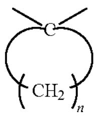

(IX)

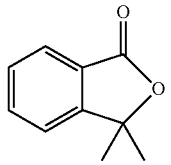

(X)

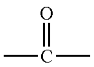

(XI)

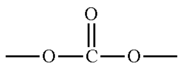

-continued (XII)

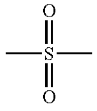

(XIII)

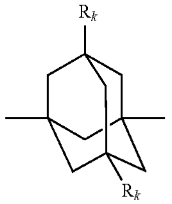

(XIV)

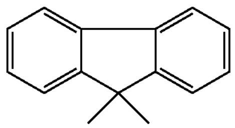

wherein h represents an integer of 4 to 7, and each of Rk independently represents a hydrogen atom or an alkyl group having 1 to 6 carbon atoms.

<4> The resin composition according to any one of items <1> to <3>, wherein the cyanate ester compound (A) comprises at least one or more selected from the group consisting of a compound represented by the following formula (XV) and a compound represented by the following formula (XVI):

(XV)

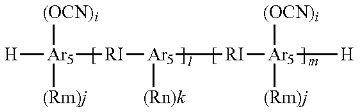

wherein each of $Ar_5$ independently represents an aromatic ring, each of Rl independently represents a methylene group, a methyleneoxy group, a methylene oxymethylene group, an oxymethylene group, or a group in which these two or more are bonded to each other, each of Rm and Rn independently represents a hydrogen atom, an alkyl group having 1 to 6 carbon atoms, an aryl group having 6 to 12 carbon atoms, or an alkoxy group having 1 to 4 carbon atoms, the alkyl group or the aryl group in Rm and Rn optionally has a substituent, i represents the number of cyanate groups bonded to $Ar_5$, being an integer of 1 to 3, j represents the number of Rm bonded to $Ar_5$, being a number obtained by subtracting (i+2) from the number of substitutable substituents of $Ar_5$, k represents the number of Rn bonded to $Ar_5$, being a number obtained by subtracting 2 from the number of substitutable substituents of $Ar_5$, 1 represents an integer of 1 or more, m represents an integer of 1 or more, and the arrangement of the repeating units is optional;

(XVI)

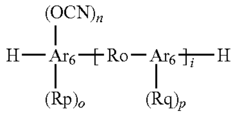

wherein each of $Ar_6$ independently represents an aromatic ring, each of Ro independently represents a methylene group, a methyleneoxy group, a methylene oxymethylene group, an oxymethylene group, or a group in which these are bonded to each other, each of Rp and Rq independently represents a hydrogen atom, an alkyl group having 1 to 6 carbon atoms, an aryl group having 6 to 12 carbon atoms, or an alkoxy group having 1 to 4 carbon atoms, the alkyl group or the aryl group in Rp and Rq optionally has a substituent, n represents the number of cyanate groups bonded to $Ar_6$, being an integer of 2 to 3, o represents the number of Rp bonded to $Ar_6$, being a number obtained by subtracting (n+2) from the number of substitutable substituents of $Ar_6$, p represents the number of Rq bonded to $Ar_6$, being a number obtained by subtracting 2 from the number of substitutable substituents of $Ar_6$, and q represents an integer of 1 or more.

<5> The resin composition according to any one of items <1> to <4>, wherein the content of the amine adduct compound (B) is 0.01 to 30 parts by mass relative to 100 parts by mass of the cyanate ester compound (A).

<6> The resin composition according to any one of items <1> to <5>, wherein the content of the borate ester (C) is 0.01 to 15 parts by mass relative to 100 parts by mass of the cyanate ester compound (A).

<7> The resin composition according to any one of items <1> to <6>, further comprising a phenolic compound (D).

<8> The resin composition according to item <7>, wherein the content of the phenolic compound (D) is 1 to 20 parts by mass relative to 100 parts by mass of the cyanate ester compound (A).

<9> The resin composition according to any one of items <1> to <8>, further comprising a toughening agent (E).

<10> The resin composition according to item <9>, wherein the toughening agent (E) comprises a thermoplastic resin.

<11> The resin composition according to item <9> or <10>, wherein the toughening agent (E) comprises a resin in powder foam.

<12> The resin composition according to any one of items <9> to <11>, wherein the content of the toughening agent (E) is 1 to 40 parts by mass relative to 100 parts by mass of the cyanate ester compound (A).

<13> The resin composition according to any one of items <1> to <11>, wherein the content of the amine adduct compound (B) is 0.01 to 30 parts by mass relative to 100 parts by mass of the cyanate ester compound (A), wherein the content of the borate ester (C) is 0.01 to 15 parts by mass relative to 100 parts by mass of the cyanate ester compound (A), wherein the resin composition further comprises a phenolic compound (D), wherein the content of the phenolic compound (D) is 1 to 20 parts by mass relative to 100 parts by mass of the cyanate ester compound (A).

<14> The resin composition according to item <13>, further comprising a toughening agent (E), wherein the content of the toughening agent (E) is 1 to 40 parts by mass relative to 100 parts by mass of the cyanate ester compound (A).

<15> A cured product of the resin composition according to any one of items <1> to <14>.

<16> A sealing material comprising the resin composition according to any one of items <1> to <14>.

<17> An adhesive comprising the resin composition according to any one of items <1> to <14>.

<18> An insulating material comprising the resin composition according to any one of items <1> to <14>.

<19> A coating material comprising the resin composition according to any one of items <1> to <14>.

<20> A prepreg famed from a base material and the resin composition according to any one of items <1> to <14>.

<21> A multilayered body famed from the prepreg according to item <20>.

<22> A fiber-reinforced composite material comprising a reinforcement fiber and a cured product of the resin composition according to any one of items <1> to <14>.

According to the present invention, a resin composition having excellent latency while maintaining excellent heat resistance, and a cured product, a sealing material, an adhesive, an insulating material, a coating material, a prepreg, a multilayered body, and a fiber-reinforced composite material, can be provided.

DETAILED DESCRIPTION OF THE PREFERRED EMBODIMENT

In the following, embodiment of the present invention (hereinafter, simply referred to as "present embodiment") is described in detail. The following present embodiment is an exemplification for illustrating the present invention, and the present invention is not limited to the present embodiment.

In the present specification, numerical values at preposition and postposition of "to" are included as a lower limit and an upper limit, respectively.

In the present specification, various physical properties and characteristic values are at 23° C., unless otherwise specified.

In the case where the measurement method described in a standard cited in the present specification is different depending on the publication year, the method is based on the standard as of Jan. 1, 2022, unless otherwise specified.

In the present specification, a resin solid content refers to components except for filler and solvent, including a cyanate ester compound (A), an amine adduct compound (B), a borate ester (C), and other thermosetting compounds that are added on an as needed basis and other resin additive components such as a phenolic compound (D) and a toughening agent (E).

The resin composition in the present embodiment comprises a cyanate ester compound (A), an amine adduct compound (B), a borate ester (C). Due to such a constitution, a resin composition having excellent latency while maintaining excellent heat resistance can be obtained.

The mechanism is presumed to be as follows. In the resin composition of the present embodiment, it is presumed that the nitrogen atom part of the amine adduct compound (B) with respect to the cyanate ester compound (A) functions as a catalyst for curing of the cyanate ester compound (A). On the other hand, during preservation of the resin composition, it is presumed that the boron of the borate ester (C) caps the nitrogen atom of the amine adduct compound (B) to suppress curing of the resin composition, so that the stability of the resin composition is secured. In other words, during preservation, it is presumed that the amine adduct compound (B) is prevented from contributing as catalyst for curing of the cyanate ester compound (A). Further, it is presumed that the bond between the boron of the borate ester (C) and the nitrogen atom of the amine adduct compound (B) is cut by heating. In other words, by heating, the amine adduct compound (B) contributes as catalyst for acceleration of curing of the cyanate ester compound (A). Further, it is presumed that the borate ester (C), which is a Lewis acid, also functions as catalyst during curing of the cyanate ester compound (A). Further, it has been found that the resin composition in the present embodiment can maintain the heat resistance at a high level, even with addition of the amine adduct compound (B) and the borate ester (C), so that the present invention has been completed.

<Cyanate Ester Compound (A)>

The resin composition of the present embodiment comprises a cyanate ester compound (A).

As the cyanate ester compound (A), a compound having 2 or more —OCN groups in one molecule is preferred, and a compound having 2 to 10 —OCN groups in one molecule is more preferred. Alternatively, the cyanate ester (A) of the present embodiment may be a prepolymer of a cyanate ester compound.

More specifically, as the cyanate ester compound (A), the cyanate ester resin described in paragraphs 0027 to 0028 of Japanese Patent Laid-Open No. 2022-046517, paragraphs 0024 to 0043 of Japanese Patent Laid-Open No. 2022-046517, and paragraphs 0012 to 0014 of Japanese Patent Laid-Open No. 2020-012065 are taken into consideration, and the content thereof is incorporated into the present specification.

In the present embodiment, it is preferable that the cyanate ester compound (A) comprises at least one selected from the group consisting of a compound represented by the following formula (I) and a compound represented by the following formula (II):

(I)

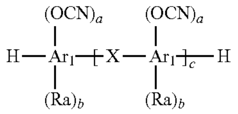

wherein each of $Ar_1$ independently represents an aromatic ring, each of Ra independently represents any one of a hydrogen atom, an alkyl group having 1 to 6 carbon atoms, an alkenyl group having 2 to 6 carbon atoms, an aryl group having 6 to 12 carbon atoms and an alkoxy group having 1 to 4 carbon atoms, the alkyl group or aryl group in Ra optionally has a substituent, a represents the number of cyanate groups bonded to $Ar_1$, being each independently an integer of 1 to 3, b represents the number of Ra bonded to $Ar_1$, being each independently a number obtained by subtracting (a+2) from the number of substitutable substituents of $Ar_1$, c is an integer of 1 to 50, each of X independently represents any one of a single bond, a divalent organic group having 1 to 50 carbon atoms, a sulfonyl group ($—SO_2—$), a divalent sulfur atom (—S—), and a divalent oxygen atom (—O—):

(II)

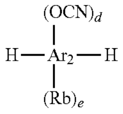

wherein $Ar_2$ represents an aromatic ring, each of Rb independently represents any one of a hydrogen atom, an alkyl group having 1 to 6 carbon atoms, an aryl group having 6 to 12 carbon atoms, and an alkoxy group having 1 to 4 carbon atoms, the alkyl group or aryl group in Rb optionally has a substituent, d represents the number of cyanate groups bonded to $Ar_2$, being an integer of 2 to 3, e represents the number of Rb bonded to $Ar_2$, being a number obtained by subtracting (d+2) from the number of substitutable substituents of $Ar_2$.

In the formula (I), each of $Ar_1$ independently represents an aromatic ring. The aromatic ring represented by $Ar_1$ is not particularly limited, and examples thereof include a phenyl group and a naphthyl group.

In the formula (I), each of Ra independently represents any one of a hydrogen atom, an alkyl group having 1 to 6 carbon atoms, an alkenyl group having 2 to 6 carbon atoms, an aryl group having 6 to 12 carbon atoms and an alkoxy group having 1 to 4 carbon atoms, and a hydrogen atom and an alkenyl group having 2 to 6 carbon atoms are preferred. The alkyl group or aryl group in Ra optionally has a substituent.

The alkyl group having 1 to 6 carbon atoms is not particularly limited, and examples thereof include a methyl group, an ethyl group, an n-propyl group, an isopropyl group, an n-butyl group, an isobutyl group, a sec-butyl group, a t-butyl group, an n-pentyl group, a neopentyl group, an n-hexyl group, a cyclopropyl group, a cyclobutyl group, a cyclopentyl group, and a cyclohexyl group. The alkyl group may be in any one of a straight-chain form, a branched form and a cyclic foam.

The alkenyl group having 2 to 6 carbon atoms is not particularly limited, and examples thereof include a vinyl group, an allyl group, a butenyl group, a pentenyl group and a hexenyl group. Among them, an alkenyl group having 2 to 10 carbon atoms is preferred, and an alkenyl group having 2 to 5 carbon atoms is more preferred. The alkenyl group may be in any one of a straight-chain form, a branched form and a cyclic form.

The alkoxy group having 1 to 4 carbon atoms is not particularly limited, and examples thereof include a methoxy group, an ethoxy group, a propoxy group and a butoxy group. The alkoxy group may be in any one of a straight-chain form, a branched foam and a cyclic form.

The aryl group having 6 to 12 carbon atoms is not particularly limited, and examples thereof include a phenyl group and a naphthyl group.

The substituent which the alkyl group or aryl group in Ra may have is not particularly limited, and examples thereof include a halogen atom, an alkyl group, a cyanate group, an alkoxy group, a carbonyl group, an amino group, an imino group, a thiol group, a sulfo group, a nitro group, an acyl group, an aldehyde group, and aryl group.

In the formula (I), a represents the number of cyanate groups bonded to $Ar_1$, being each independently an integer of 1 to 3, preferably an integer of 1 to 2, more preferably 1.

In the formula (I), b represents the number of Ra bonded to $Ar_1$, being each independently a number obtained by subtracting (a+2) from the number of substitutable substituents of $Ar_1$.

In the formula (I), c is an integer of 1 to 50, preferably an integer of 1 to 10, more preferably an integer of 1 to 5, and still more preferably 1.

In the formula (I), each of X independently represents any one of a single bond, a divalent organic group having 1 to 50 carbon atoms, a sulfonyl group ($—SO_2—$), a divalent sulfur atom (—S—), and a divalent oxygen atom (—O—). The divalent organic group having 1 to 50 carbon atoms represented by X is not particularly limited. Preferred examples thereof include a divalent organic group having 1 to 10 nitrogen atoms (—N—R—N—, wherein R represents an organic group), a carbonyl group (—CO—), a carboxy group (—C(═O)O—), a carbonyl dioxide group (—OC(═O)O—), and a divalent linking group selected from the group consisting of structures represented by the following formulas (III) to (XIV), and more preferred examples thereof include a divalent linking group selected from the group consisting of structures represented by the following formulas (III) to (XIV):

(III)

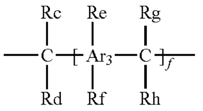

wherein each of $Ar_3$ independently represents an aromatic ring, each of Rc, Rd, Rg and Rh independently represents a hydrogen atom, an alkyl group having 1 to 6 carbon atoms, or an aryl group having 6 to 12 carbon atoms, the alkyl group or aryl group in Rc, Rd, Rg and Rh optionally has a substituent, each of Re and Rf independently represents any one of a hydrogen atom, an alkyl group having 1 to 6 carbon atoms, an aryl group having 6 to 12 carbon atoms and an alkoxy group having 1 to 4 carbon atoms, the alkyl group or aryl group in Re and Rf optionally has a substituent, and f represents an integer of 0 to 5;

(IV)

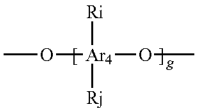

wherein each of $Ar_4$ independently represents an aromatic ring, each of Ri and Rj independently represents a hydrogen atom, an alkyl group having 1 to 6 carbon atoms, an aryl group having 6 to 12 carbon atoms, or an alkoxy group having 1 to 4 carbon atoms, the alkyl group or aryl group in Ri and Rj optionally has a substituent, and g represents an integer of 0 to 5;

—O— (V)

(VI)

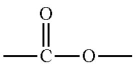

—S— (VII)

(VIII)

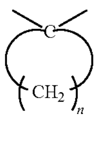

-continued (IX)

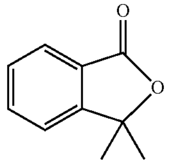

(X)

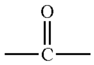

(XI)

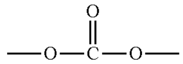

(XII)

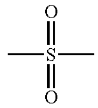

(XIII)

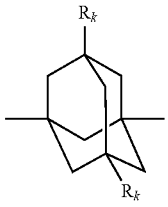

(XIV)

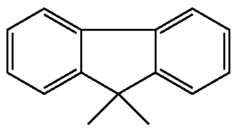

wherein h represents an integer of 4 to 7, and each of Rk independently represents a hydrogen atom or an alkyl group having 1 to 6 carbon atoms.

In the formulas (III) and (IV), examples of the aromatic rings represented by Ara and $Ar_4$ include the same ones as exemplified for $Ar_1$ with the same preferred ranges. Further, in the formulas, examples of the alkyl group having 1 to 6 carbon atoms, the aryl group having 6 to 12 carbon atoms, an alkoxy group having 1 to 4 carbon atoms, and a substituent thereof represented by Rc, Rd, Rg, Rh, Re, Rf, Ri and Rj include the same ones as exemplified for Ra with the same preferred ranges.

In the formula (II), Are represents an aromatic ring, being the same as $Ar_1$ in the formula (I) with the same preferred ranges.

In the formula (II), each of Rb independently represents any one of a hydrogen atom, an alkyl group having 1 to 6 carbon atoms, an aryl group having 6 to 12 carbon atoms, and an alkoxy group having 1 to 4 carbon atoms, wherein the alkyl group or aryl group in Rb optionally has a substituent. Rb is the same as Ra in formula (I), with the same preferred ranges.

In the formula (II), d represents the number of cyanate groups bonded to $Ar_2$, being an integer of 2 to 3, and e represents the number of Rb bonded to $Ar_2$, being a number obtained by subtracting (d+2) from the number of substitutable substituents of $Ar_2$.

Further, it is more preferable that the cyanate ester compound (A) comprises at least one or more selected from the group consisting of a compound represented by the following formula (XV) and a compound represented by the following formula (XVI):

(XV)

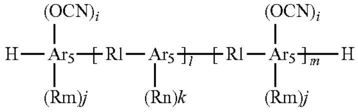

wherein each of $Ar_5$ independently represents an aromatic ring, each of Rl independently represents a methylene group, a methyleneoxy group, a methylene oxymethylene group, an oxymethylene group, or a group in which these two or more are bonded to each other, each of Rm and Rn independently represents a hydrogen atom, an alkyl group having 1 to 6 carbon atoms, an aryl group having 6 to 12 carbon atoms, or an alkoxy group having 1 to 4 carbon atoms, the alkyl group or aryl group in Rm and Rn optionally has a substituent, i represents the number of cyanate groups bonded to $Ar_5$, being an integer of 1 to 3, j represents the number of Rm bonded to $Ar_5$, being a number obtained by subtracting (i+2) from the number of substitutable substituents of $Ar_5$, k represents the number of Rn bonded to $Ar_5$, being a number obtained by subtracting 2 from the number of substitutable substituents of $Ar_5$, 1 represents an integer of 1 or more, m represents an integer of 1 or more, and the arrangement of the repeating units is optional.

In the formula (XV), examples of the aromatic rings represented by $Ar_5$ include the same ones as exemplified for $Ar_1$ with the same preferred ranges.

In the formula (XV), examples of the alkyl group having 1 to 6 carbon atoms, an aryl group having 6 to 12 carbon atoms, an alkoxy group having 1 to 4 carbon atoms, and a substituent thereof represented by Rm and Rn include the same ones as exemplified for Ra with the same preferred ranges.

In the formula (XV), 1 represents an integer of 1 or more, preferably 1 to 10, and more preferably 1 to 5.

In the formula (XV), m represents an integer of 1 or more, preferably 1 to 10, and more preferably 1 to 5.

(XVI)

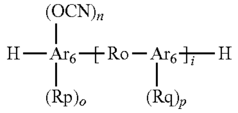

wherein each of $Ar_6$ independently represents an aromatic ring, each of Ro independently represents a methylene group, a methyleneoxy group, a methylene oxymethylene group, an oxymethylene group, or a group in which these are bonded to each other, each of Rp and Rq independently represents a hydrogen atom, an alkyl group having 1 to 6 carbon atoms, an aryl group having 6 to 12 carbon atoms, or an alkoxy group having 1 to 4 carbon atoms, the alkyl group or aryl group in Rp and Rq optionally has a substituent, n represents the number of cyanate groups bonded to $Ar_6$, being an integer of 2 to 3, o represents the number of Rp bonded to $Ar_6$, being a number obtained by subtracting (n+2) from the number of substitutable substituents of $Ar_6$, p represents the number of Rq bonded to $Ar_6$, being a number obtained by subtracting 2 from the number of substitutable substituents of $Ar_6$, and q represents an integer of 1 or more.

In the formula (XVI), examples of the aromatic rings represented by $Ar_6$ include the same ones as exemplified for $Ar_1$ with the same preferred ranges.

In the formula (XVI), examples of the alkyl group having 1 to 6 carbon atoms, an aryl group having 6 to 12 carbon atoms, an alkoxy group having 1 to 4 carbon atoms, and a substituent thereof represented by Rp and Rq include the same ones as exemplified for Ra with the same preferred ranges.

In the formula q represents an integer of 1 or more, preferably 1 to 10, and more preferably 1 to 5.

The cyanate ester compound (A) for use in the present embodiment may be a prepolymer as described above. Examples of the prepolymer include a prepolymer as reaction product of two or more molecules (preferably 2 to 10 molecules) of the compound represented by the formula (I) and/or the compound represented by the formula (II) (with a part of cyanate ester groups remaining). From such a prepolymer, a resin composition excellent in handling a prepreg can be easily produced.

The content of the cyanate ester compound (A) in the resin composition of the present embodiment relative to 100 parts by mass of the resin solid content in the resin composition is preferably 50 parts by mass or more, more preferably 60 parts by mass or more, still more preferably 65 parts by mass or more, further preferably 70 parts by mass or more, and furthermore preferably 75 parts by mass or more. With a content equal to or more than the lower limit, the high heat resistance tends to be further improved. Further, the upper limit of the content of the cyanate ester compound (A), which is the amount where all the resin solid content of the amine adduct compound (B) and the borate ester (C) is replaced with the cyanate ester compound (A), is specifically preferably 99 parts by mass or less, more preferably 97 parts by mass or less, relative to 100 parts by mass of the resin solid content in the resin composition.

The resin composition of the present embodiment may contain only one type of the cyanate ester compound (A), or may contain two or more types. In the case where two or more types are contained, it is preferable that the total amount be in the range described above.

<Amine Adduct Compound (B)>

The resin composition of the present embodiment comprises an amine adduct compound (B). By containing an amine adduct compound (B), a resin composition excellent in stability during preservation and curability during heating can be obtained.

The amine adduct compound (B) is usually a solid at normal temperature (for example, 25° (S), and starts to be softened by heating, so that the reactivity is improved. The softening temperature of the amine adduct compound (B) is preferably 90° C. or more, more preferably 100° C. or more, and preferably 150° C. or less, more preferably 145° C. or less. With a temperature equal to or more than the lower limit, the stability during preservation tends to be further improved. With a temperature equal to or less than the upper limit, the curability tends to be further improved. The softening temperature is determined by a testing method in accordance with JIS K7234: 1986.

The amine adduct compound (B) is an adduct of an amine compound, which is preferably an adduct of an amine compound (preferably an imidazole compound or a compound having a tertiary amino group) and at least one compound selected from the group consisting of a carboxylic acid compound, a sulfonic acid compound, a urea compound, an isocyanate compound and an epoxy resin, more preferably an adduct of an amine compound and at least one compound selected from the group consisting of a urea compound, an isocyanate compound and an epoxy resin, and still more preferably an adduct of an amine compound and an isocyanate compound and/or an epoxy resin.

The amine may be, for example, one having one or more active hydrogen in a molecule and having 1 or more (preferably 1 to 3, more preferably 1 or 2, and still more preferably 1) at least one selected from the group consisting of a primary amino group, a secondary amino group and a tertiary amino group in a molecule, and it is preferable that one or more secondary amino groups or tertiary amino groups be contained in the molecule. As described above, it is preferable that the amine compound be an imidazole compound or a compound having a tertiary amino group.

Examples of the imidazole compound include 2-ethyl-4-methylimidazole, 2-methylimidazole, 2-ethyl-4-methylimdazoline, 2,4-dimethylimidazoline, 1-(2-hydorxy-3-phenoxypropyl)-2-methylimidazole, 1-(2-hydorxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, and 1-(2-hydroxy-3-butoxypropyl)-2-methylimidazoline.

Examples of the compound having a tertiary amino group include dimethyl aminopropyl amine, diethyl aminopropyl amine, di-n-propyl aminopropyl amine, dibutyl aminopropyl amine, dimethyl aminoethyl amine, diethyl aminoethyl amine, N-methyl piperazine, N-aminoethyl piperazine, 1,4-bis(3-aminopropyl)piperazine, 2-dimethylamino ethanol, 1-methyl-2-dimethylamino ethanol, 1-phenoxymethyl-2-dimethylamino ethanol, 2-deiethylamino ethanol, 1-butoxymethyl-2-dimethylamino ethanol, dimethylaminomethyl phenol, 2,4,6-tris(dimethylaminomethyl)phenol, N-β-hydroxyethyl formalin, 2-dimethylamino ethanethiol, 1,4-diazabicyclo[2,2,2]octane, N,N-dimethyl-N'-phenylurea, N,N-dimethyl-N'-(3,4-dichlorophenyl)urea, toluene bis(dimethylurea), 4,4'-methylene bis(phenyl dimethylurea), 2-mercaptopyridine, N,N-dimethyl aminobenzoic acid, N,N-dimethylglycine, nicotinic acid, iso-nicotinic acid, picolinic acid, N,N-dimethylglycine hydrazide, N,N-dimethyl propionic acid hydrazide, nicotinic acid hydrazide, and iso-nicotinic acid hydrazide.

The urea compound is not particularly limited as long as the compound has at least one selected from the group consisting of a ureide bond, a ureylene bond and a NH—CO—N. Examples thereof include urea, urea phosphate, urea oxalate, urea acetate, diacetyl urea, dibenzoyl urea and trimethyl urea.

The isocyanate compound is not particularly limited. Examples thereof include a monofunctional isocyanate compound such as n-butyl isocyanate, phenyl isocyanate and hexamethylene diisocyanate; and a polyfunctional compound such as hexamethylene diisocyanate, toluylene diisocyanate, 1,5-naphthalene diisocyanate, isophorone diisocyanate, xylylene diisocyanate, and 1,3,6-hexamethylene triisocyanate.

The epoxy resin is not particularly limited. Examples thereof include a polyglycidyl ether which is obtained through a reaction between a polyvalent phenol such as bisphenol A, bisphenol F, bisphenol AD, catechol and resorcinol, or a polyvalent alcohol such as glycerol and polyethylene glycol, and epichlorohydrin; a glycidyl ether ester which is obtained through a reaction between a hydroxycarboxylic acid such as p-hydroxybenzoic acid and β-hydroxy naphthoic acid and epichlorohydrin; a polyglycidyl ester which is obtained through a reaction between a polycarboxylic acid such as phthalic acid and terephthalic acid, and epichlorohydrin; an epoxidized phenol novolac resin, an epoxidized cresol novolac resin, an epoxidized polyolefin, a cyclic aliphatic epoxy resin, a urethane-modified epoxy resin, and a glycidyl amine-type epoxy resin obtained from 4,4-diaminodiphenyl methane and m-aminophenol.

As the amine adduct compound (B) used in the present embodiment, ones described in paragraphs 0067 to 0077 of Japanese Patent Laid-Open No. 2021-075698, paragraphs 0040 to 0052 of Japanese Patent Laid-Open No. 2019-123825, paragraphs 0030 to 0038 of Japanese Patent Laid-Open No. 2016-153513, a paragraph 0023 of Japanese Patent Laid-Open No. 2013-151700, paragraphs 0037 to 0051 of Japanese Patent Laid-Open No. 2020-200389, and paragraphs 0026 to 0036 of Japanese Patent Laid-Open No. 2020-100684 may be used other than the above-mentioned ones, and the content thereof is incorporated into the present specification.

The content of the amine adduct compound (B) in the resin composition of the present embodiment relative to 100 parts by mass of the cyanate ester compound (A) is preferably 0.01 parts by mass or more, more preferably 0.05 parts by mass or more, still more preferably 0.1 parts by mass or more, further preferably 0.5 parts by mass or more, and furthermore preferably 0.8 parts by mass or more. With a content equal to or more than the lower limit, the effect for accelerating curing tends to be further improved. Further, the upper limit of the content of the amine adduct compound (B) relative to 100 parts by mass of the cyanate ester compound (A) is preferably 30 parts by mass or less, more preferably 20 parts by mass or less, still more preferably 10 parts by mass or less, further preferably 5 parts by mass or less, and furthermore preferably 3 parts by mass or less. With a content equal to or less than the upper limit, the stability of the resin composition during preservation tends to be further improved.

The resin composition of the present embodiment may contain only one type of the amine adduct compound (B), or may contain two or more types. In the case of containing two or more types, it is preferable that the total amount be in the range.

<Borate Ester (C)>

The resin composition of the present embodiment comprises a borate ester (C). By containing a borate ester (C), a resin composition excellent in stability during preservation and curability during heating can be obtained.

In the present embodiment, it is preferable that the borate ester (C) is a compound which can suppress the activity of nitrogen atoms of the amine adduct compound (B).

It is preferable that the borate ester (C) is a compound represented by a formula (C).

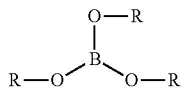

(C)

wherein each of R independently represents a hydrocarbon group having 1 to 20 carbon atoms, which optionally has a substituent, and one or two or more oxygen atoms may be included in the hydrocarbon group.

Examples of the substituent which R may have include a hydroxy group, an amino group and a carboxy group. These substituents may be at an end of a hydrocarbon group or at a portion other than the end.

R is preferably a hydrocarbon group having 1 to 20 carbon atoms with no substituent, more preferably an alkyl group having 1 to 10 carbon atoms with no substituent (preferably an alkyl group having 1 to 10 carbon atoms in a straight-chain foam or branched faint) or an aryl group having 6 to 12 carbon atoms without substituent (preferably a phenyl group).

The three Rs in the formula (C) may be the same or different from each other, and it is preferable that Rs be the same.

The molecular weight of the borate ester (C) for used in the present embodiment is preferably 104 to 1500, more preferably 104 to 1000, still more preferably 104 to 500, and further preferably 104 to 350.

Specific examples of the borate ester (C) for use in the present embodiment include trimethyl borate, triethyl borate, tripropyl borate, tri-isopropyl borate, tributyl borate, tripentyl borate, triallyl borate, trihexyl borate, trioctyl borate, tri-isooctyl borate, trinonyl borate, tridecyl borate, tridodecyl borate, trihexadecyl borate, trioctadecyl borate, triphenyl borate, tricyclohexyl borate, tribenzyl borate, tritolyl borate, triethanolamine borate, tris-o-phenylene bisborate, bis-o-phenylene pyroborate, bis-2,3-dimethylethylene phenylene pyroborate, bis-2,2-dimethyltrimethylene pyroborate, tris(2-ethylhexyloxy)borane, bis(1,4,7,10-tetraoxaundecyl) (1,4,7,10,13-pentaoxatetradecyl) (1,4,7-trioxaundecyl)borane, 2-(β-dimethylamino isopropoxy)-4,5-dimethyl-1,3,2-dioxaborane, 2-(β-diethylamino ethoxy)-4,4,6-trimethyl-1,3,2-dioxaborinane, 2-(β-dimethylamino ethoxy)-4,4,6-trimethyl-1,3,2-dioxaborinane, 2-(β-diisopropylamino ethoxy)-1,3,2-dioxaborinane, 2-(β-diisopropylamino ethoxy)-4-methyl-1,3,2-dioxaborinane, 2-(γ-dimethylamino propoxy)-1,3,6,9-tetrapxa-2-boracycloundecane, 2-(β-dimethylamino ethoxy)-4,4-(4-hydroxybutyl)-1,3,2-dioxaborinane, and 2,2-oxybis(5,5-dimethyl-1,3,2-dioxabonarine).

The content of the borate ester (C) in the resin composition of the present embodiment relative to 100 parts by mass of the cyanate ester compound (A) is preferably 0.01 parts by mass or more, more preferably 0.05 parts by mass or more, still more preferably 0.08 parts by mass or more, further preferably 0.1 parts by mass or more, and furthermore preferably 0.2 parts by mass or more, and may be 0.4 parts by mass or more. With a content equal to or more than the lower limit, the stability and curability of the resin composition tend to be further improved. Further, the upper limit of the content of the borate ester (C) relative to 100 parts by mass of the cyanate ester compound (A) is preferably 15 parts by mass or less, more preferably 10 parts by mass or less, still more preferably 5 parts by mass or less, further preferably 3 parts by mass or less, and furthermore preferably 1 part by mass or less. With a content equal to or less than the upper limit, the stability of the resin composition and the heat resistance of the cured product tend to be further improved.

The resin composition of the present embodiment may contain only one type of the borate ester (C), or may contain two or more types. In the case of containing two or more types, it is preferable that the total amount be in the range.

The resin composition of the present embodiment has a mass ratio between the amine adduct compound (B) and the borate ester (C), (amine adduct compound (B)/borate ester (C)) of preferably 0.5 or more, more preferably 1.0 or more, and still more preferably 1.5 or more. With a ratio equal to or more than the lower limit, the effect of the present invention tends to be more effectively improved. The mass ratio between the amine adduct compound (B) and the borate ester (C), (amine adduct compound (B)/borate ester (C)) is preferably 10.0 or less, more preferably 5.0 or less, and still more preferably 3.5 or less. With a ratio equal to or less than the upper limit and equal to or more than the lower limit, the effect of the present invention tends to be more effectively improved.

<Phenolic Compound (D)>

It is preferable that the resin composition of the present embodiment contain a phenolic compound (D). By containing a phenolic compound, the curability tends to be more improved.

The phenolic compound (D) in the present embodiment means a compound having a structure including a benzene ring to which at least a hydroxy group is directly bonded, and the compound having a structure including a benzene ring to which at least a hydroxy group is directly bonded is preferred. The phenolic compound (D) may be a low molecular weight compound or a high molecular weight compound. The benzene ring of the phenolic compound (D) optionally has a substituent other than a hydroxy group. In the case where the benzene ring has a substituent other than a hydroxy group, the number of substituents other than a hydroxy group per benzene ring is preferably 1 to 3.

Examples of the other substituent include a hydrocarbon group having 1 to 20 carbon atoms, an alkoxy group having 1 to 20 carbon atoms, an aryloxy group having 6 to 20 carbon atoms, an alkylcarbonyl group having 1 to 20 carbon atoms, an alkoxycarbonyl group having 1 to carbon atoms, an arylcarbonyl group having 6 to 20 carbon atoms and a halogen atom. A hydrocarbon group having 1 to 20 carbon atoms, an alkoxy group having 1 to 20 carbon atoms, an aryloxy group having 6 to carbon atoms, an alkylcarbonyl group having 1 to 20 carbon atoms, an alkoxycarbonyl group having 1 to 20 carbon atoms and an arylcarbonyl group having 6 to 20 carbon atoms are preferred, and a hydrocarbon group having 1 to 20 carbon atoms are more preferred. Alternatively, two of the other substituents bonded to a benzene ring may bond to each other to foam a ring. Examples of the ring famed by two of the other substituents bonded to a benzene ring bonding to each other include a naphthalene ring and an indane ring.

It is preferable that the phenolic compound (D) for use in the present embodiment is a compound having a structure in which one or two hydroxy groups directly bond preferably to a benzene ring. Examples of the substituent include a hydrocarbon group having 5 to 20 carbon atoms (preferably an alkyl group).

An example of the phenolic compound (D) for use in the present embodiment is a low molecular weight compound, which is, for example, a compound having a molecular weight of 94 to 1000, preferably 94 to 500.

Another example of the phenolic compound (D) for use in the present embodiment is a high molecular weight compound, which is, for example, a phenolic compound having a molecular weight of more than 1000 and 100000 or less, preferably more than 1000 and 10000 or less.

Specific examples of the phenolic compound (D) for use in the present embodiment include phenol, cresol, xylenol, ethyl phenol, o-isopropyl phenol, butyl phenol such as p-tert-butyl phenol, p-tert-octyl phenol, nonyl phenol, dinonyl phenol, catechol, resorcinol, hydroquinone, trihydroxybenzene, styrenated phenol, oxybenzoate, thymol, p-naphthol, p-nitrophenol, p-chlorophenol, a phenol novolac resin, a cresol novolac resin, and a xylenol novolac resin, and nonyl phenol and dinonyl phenol are preferred.

In the case where the resin composition of the present embodiment contains the phenolic compound (D), the content thereof relative to 100 parts by mass of the cyanate ester compound (A) is preferably 1 part by mass or more, more preferably 2 parts by mass or more, still more preferably 3 parts by mass or more, further preferably 4 parts by mass or more, and furthermore preferably 5 parts by mass or more. With a content equal to or more than the lower limit, the curability tends to be further improved. The upper limit of the content of the phenolic compound (D) relative to 100 parts by mass of the cyanate ester compound (A) is preferably 20 parts by mass or less, more preferably 17 parts by mass or less, still more preferably 14 parts by mass or less, further preferably 12 parts by mass or less, and furthermore preferably 10 parts by mass or less. With a content equal to or less than the upper limit, the heat resistance of a cured product tends to be further improved.

The resin composition of the present embodiment may contain only one type of the phenolic compound (D) or may contain two or more types. In the case of containing two or more types, it is preferable that the total amount be in the range.

<Toughening Agent (E)>

The resin composition of the present embodiment may contain a toughening agent (E). Addition of a toughening agent (E) allows the resulting cured product to have a further improved toughness.

Examples of the toughening agent (E) include a resin. An example of the resin as the toughening agent (E) is a thermoplastic resin, and another example is a resin in powder faint.

In general, the thermoplastic resin is preferably a thermoplastic resin having a main chain with a bond selected from a carbon-carbon bond, an amide bond, an imide bond, an ester bond, an ether bond, a carbonate bond, a urethane bond, a thioether bond, a sulfone bond and a carbonyl bond, and may partially have a cross-linked structure. Further, the thermoplastic resin may be crystalline or amorphous. In particular, at least one resin selected from the group consisting of a polyamide resin, a polycarbonate resin, a polyacetal resin, a polyphenylene oxide resin, a polyphenylene sulfide resin, a polyarylate resin, a polyester resin, a polyamide imide resin, a polyimide resin, a polyether imide resin, a polyimide resin having a phenyl trimethyl indane structure, a polysulfone resin, a polyether sulfone resin, a polyether ketone resin, a polyether ether ketone resin, a polyaramid resin, a polyether nitrile resin, and a polybenzimidazole resin is preferred, and a polyimide resin is more preferred.

As the polyimide resin, the description in paragraphs 0013 to 0021 in Japanese Patent Laid-Open No. 2022-045273 may be taken into consideration, and the content thereof is incorporated into the present specification.

As the resin in powder foam, a thermoplastic resin in powder foam is preferred, and examples thereof include a rubber powder such as a styrene type powder, a butadiene type powder and an acrylic type powder; a core-shell type rubber powder; and a silicone type powder. Among these resins in powder faint, silicone type powder is preferred from the viewpoints of further excellence in stiffness of the resulting cured product and further reduction in warpage.

Examples of the silicone type powder include a silicone resin powder, a silicone rubber powder, and a silicone composite powder. Among these, a silicone composite powder is preferred from the viewpoints of further excellence in stiffness and further reduction in warpage of the resulting cured product.

Examples of the silicone composite powder include KMP-600 (trade name), KMP-601 (trade name), KMP-602 (trade name), KMP-605 (trade name) and X-52-7030 (trade name), manufactured by Shin-Etsu Chemical Co., Ltd.

In the case where the resin composition of the present embodiment contains the toughening agent (E), the content thereof relative to 100 parts by mass of the cyanate ester compound (A) is preferably 1 part by mass or more, more preferably 3 parts by mass or more, still more preferably 5 parts by mass or more, further preferably 10 parts by mass or more, and furthermore preferably 15 parts by mass or more. With a content equal to or more than the lower limit, the toughness of the resulting cured product tends to be further improved. The upper limit of the content of the toughening agent (E) relative to 100 parts by mass of the cyanate ester compound (A) is preferably 40 parts by mass or less, more preferably 38 parts by mass or less, still more preferably 33 parts by mass or less, further preferably 30 parts by mass or less, and may be 27 parts by mass or less. With a content equal to or less than the upper limit, the heat resistance of a cured product tends to be further improved.

The resin composition of the present embodiment may contain only one type of the toughening agent (E) or may contain two or more types. In the case of containing two or more types, it is preferable that the total amount be in the range.

<Other Thermosetting Resin>

The resin composition of the present embodiment may or may not contain a thermosetting resin other than the cyanate ester compound (A). Examples of the other thermosetting resin include an epoxy resin, a maleimide resin, a phenolic resin, a polyphenylene ether resin, a benzoxazine resin, an organic group-modified silicone, an alkenyl-substituted nadimide compound and a resin having a polymerizable carbon-carbon unsaturated group. For details thereof, each of the descriptions in paragraphs 0020 to 0028, paragraphs 0054 to 0056, and paragraphs 0067 to 0070 of International Publication No. WO 2022/034872, the description in paragraphs 0036 to 0070 of Japanese Patent Laid-Open No. 2022-000506, and the description in paragraphs 0049 to 0057 of Japanese Patent Laid-Open No. 2022-046517 are taken into consideration, and the content thereof is incorporated into the present specification.

In the case where the resin composition of the present embodiment contains a thermosetting resin other than the cyanate ester compound (A), the content thereof is preferably 5 to 30 parts by mass relative to 100 parts by mass of resin solid content in the resin composition.

Alternatively, the resin composition of the present embodiment may contain substantially no thermosetting resin other than the cyanate ester compound (A). Containing substantially no thermosetting resin means that the content relative to 100 parts by mass of resin solid content in the resin composition is less than 5 parts by mass, preferably 3 parts by mass or less, more preferably 1 part by mass or less, and still more preferably 0.1 parts by mass or less.

<Other Component>

The resin composition of the present embodiment may further contain a filler (including inorganic filler and organic filler), a silane coupling agent, a wetting and dispersing agent and a solvent, in addition to the above. Further, an impact resistance improver, a curing accelerator, a flame retardant, a conductivity imparting agent, a crystal nucleator, an ultraviolet absorbent, an antioxidant, a damping agent, an antibacterial agent, an insecticide, a deodorizer, an anti-tarnish agent, a thermal stabilizer, a mold release agent, an antistatic agent, a plasticizer, a lubricant, a colorant, a pigment, a dye, a blowing agent, and a foam control agent may be added to the resin composition. For details thereof, the descriptions in paragraphs 0057 to 0052 of Japanese Patent Laid-Open No. 2021-195389, and the description in paragraphs 0040 to 0048 of Japanese Patent Laid-Open No. 2022-046517 are taken into consideration, and the content thereof is incorporated into the present specification.

In the case where the filler is contained in the resin composition of the present embodiment, the content ratio thereof is preferably 10 to 500 parts by mass relative to 100 parts by mass of the resin solid content. Alternatively, the resin composition of the present embodiment may contain substantially no filler. Containing substantially no filler means that the content of the filler in the resin composition relative to 100 parts by mass of resin solid content is less than 10 parts by mass, preferably 5 parts by mass or less, more preferably 3 parts by mass or less, and still more preferably 1 part by mass or less.

<Physical Properties of Resin Composition>

It is preferable that the resin composition of the present embodiment have a viscosity at 80° C. of 0.05 to 50 Pas. With such a viscosity, the resin composition is preferably used as various materials. Further, the viscosity at 80° C. of the resin composition of the present embodiment is preferably 0.10 Pas or more and 40 Pas or less, more preferably 30 Pas or less, still more preferably 20 Pas or less, further preferably 10 Pas or less, and furthermore preferably 8 Pas or less.

In particular, in the case where the resin composition of the present embodiment is used for a prepreg, the viscosity at 80° C. is preferably 0.1 Pas or more, more preferably 2 Pas or more, and preferably 10 Pas or less, more preferably 8 Pas or less.

The viscosity is measured according to the description in the following Example.

It is preferable that the resin composition of the present embodiment have excellent stability during preservation. For example, the viscosity of each of the compositions after preservation at 80° C. for minutes represented as a relative viscosity relative to 100 of the viscosity before initiation of testing is preferably 180 or less, more preferably 150 or less, still more preferably 140 or less, further preferably 130 or less, and furthermore preferably 120 or less. The lower limit of the relative viscosity is preferably 100, even with a lower limit of 101 or more, the required performance is sufficiently satisfied.

The relative viscosity is measured according to the description in the following Example.

It is preferable that the resin composition of the present embodiment be excellent in curability. For example, in observation of exothermic behavior of each composition using a differential scanning calorimeter under measurement conditions at an initial temperature of 40° C., a termination temperature of 380° C., and a heating rate of 3° C./minute, the peak top temperature is preferably 185° C. or less, more preferably 180° C. or less, still more preferably 175° C. or less, further preferably 170° C. or less, and furthermore preferably 165° C. or less. Further, the lower limit of the peak top temperature is preferably 100° C. or more, more preferably 110° C. or more, still more preferably 120° C. or more, further preferably 130° C. or more, and furthermore preferably 135° C. or more.

The peak top temperature is measured according to the description in the following Example.

It is preferable that the resin composition of the present embodiment have higher heat resistance. For example, the glass transition temperature of the cured product obtained by heating the resin composition of the present embodiment at 135° C. for 8 hours and then at 177° C. for 4 hours is preferably 180° C. or more, more preferably 184° C. or more, still more preferably 190° C. or more, further preferably 195° C. or more, and furthermore preferably 200° C. or more. On the other hand, the upper limit of the glass transition temperature is not particularly specified, practically 300° C. or less, and even with a glass transition temperature of 250° C. or less, the required performance is sufficiently satisfied.

The glass transition temperature (Tg) is obtained as follows. The storage modulus G' of a cured product of the resin composition is measured by a DMA method according to JIS C6481 with a dynamic viscoelasticity tester to define the onset value as glass transition temperature (Tg).

The detail of the measurement is according to the description in the following Example.

<Use>

The resin composition of the present embodiment is preferably used as a cured product, a prepreg, a multilayered body, a sealing material, an adhesive, an insulating material, a coating material, or a fiber-reinforced composite material. These are described in the following.

<<Cured Product>>

The cured product of the present embodiment is a cured product of the resin composition of the present embodiment. The production method of the cured product is not particularly limited, and, for example, the cured product is obtained by melting the resin composition or dissolving the resin composition in a solvent, then pouring the melt or the solution into a mold, and curing the same with heat or light under normal conditions. In the case of thermal curing, the curing temperature is not particularly limited, preferably in the range of 120 to 300° C. from the viewpoints of efficient progress of curing and prevention of deterioration of the resulting cured product. In the case of photo-curing, the wavelength range is not particularly limited, and it is preferable that the curing be performed with light in a range of 100 to 500 nm, where the curing proceeds efficiently with a photopolymerization initiator.

<<Prepreg>>

The prepreg of the present embodiment is foamed of a base material and the resin composition of the present embodiment. More specifically, the prepreg of the present embodiment has a base material and a resin composition or a cured product applied (for example, impregnation or coating) to the base material. In other words, the resin composition in the prepreg may be uncured or may be a cured product including a semi-cured product. Alternatively, the resin composition in the prepreg may be a resin composition with solvent removed.

The production method of a prepreg may be according to the conventional method and is not particularly limited.

For example, the resin composition of the present embodiment may be applied to a base material (preferably by coating) to make a prepreg. On this occasion, the resin composition may be heated for application to the base material and then cooled to normal temperatures, or a solvent may be added to the resin composition for application to the base material and then the solvent may be removed.

Alternatively, for example, the resin composition of the present embodiment may be applied to a base material and then semi-cured (into B-stage) by heating in a dryer at 100 to 200° C. for 1 to 30 minutes to make the prepreg of the present embodiment.

The total amount of the resin solid content and the filler in the resin composition relative to the total amount of a prepreg is preferably 30 mass % or more, more preferably 35 mass % or more, still more preferably 40 mass % or more, and preferably 90 mass % or less, more preferably 85 mass % or less, and still more preferably 80 mass % or less. With a content of the resin composition in the range, tamability of the prepreg tends to be further improved.

The base material of a prepreg may be appropriately selected and used without particular limitation, depending on the intended use and performance. Specific examples of the fiber to constitute the base material are not particularly limited, including a glass fiber such as E-glass, D-glass, S-glass, Q-glass, spherical glass, NE-glass, L-glass and T-glass; an inorganic fiber other than glass fiber such as quartz fiber, carbon fiber, boron fiber, and basalt fiber; a wholly aromatic polyamide such as polyparaphenylene terephthalamide (Kevlar (registered trademark), manufactured by DuPont), and copolyparaphenylene 3,4'-oxydiphenylene terephthalamide (Technora (registered trademark), manufactured by Teijin Techno Products Ltd.); a polyester such as 2,6-hydroxynaphthoic acid parahydroxybenzoic acid (Vectran (registered trademark), manufactured by Kuraray Co., Ltd.), and Zxion (registered trademark, manufactured by KB Seiren DTY, Ltd.); and an organic fiber such as polyparaphenylene benzoxazole (Zylon (registered trademark), manufactured by TOYOBO Co., Ltd.) and polyimide. Among those, at least one selected from the group consisting of carbon fiber and/or glass fiber is preferred and one made of carbon fiber is more preferred. One type of these base materials may be used alone, or two or more types may be used in combination.

The shape of the base material is not particularly limited, and examples thereof include knitted fabric, nonwoven fabric, roving, chopped strand mat, and surfacing mat. The knitting method may be appropriately selected from known methods such as plain weaving, basket weaving and twill weaving without particular limitation for use, depending on the intended use and performance. Further, these subjected to fiber opening treatment and glass woven fabric with a surface treated with a silane coupling agent are preferably used. The thickness and mass of the base material are not particularly limited, and typically ones having a thickness of about 0.01 to 0.3 mm are preferably used. In particular, from the viewpoints of strength and water absorbency, it is preferable that the base material is a woven fabric of glass fiber and/or carbon fiber.

The multilayered body of the present embodiment is famed of the prepreg of the present embodiment. It is preferable that the multilayered body of the present embodiment include two or more plies of prepregs stacked. In the multilayered body of the present embodiment, the resin composition in the prepreg may be uncured or may be a cured product including a semi-cured product.

The multilayered body of the present embodiment may have other constituent layers without departing from the scope of the resin of the present embodiment.

The prepreg and the multilayered body of the present embodiment are preferably used as materials for aerospace <<Sealing Material>>

The sealing material of the present embodiment includes the resin composition of the present embodiment. As the production method of the sealing material, a known method may be generally appropriately used and not particularly limited. For example, the resin composition described above and various known additives or a solvent generally used for sealing materials are mixed with a known mixer to produce the sealing material. Incidentally, the method for adding each component during mixing is not particularly limited, and a generally known method may be appropriately applied.

<<Adhesive>>

The adhesive of the present embodiment includes the resin composition of the present embodiment. As the production method of the adhesive, a known method may be generally appropriately used and not particularly limited. For example, the resin composition described above and various known additives or a solvent generally used for adhesives are mixed with a known mixer to produce the adhesive. Incidentally, the method for adding each component during mixing is not particularly limited, and a generally known method may be appropriately applied.

<<Insulating Material>>

The insulating material of the present embodiment includes the resin composition of the present embodiment. As the production method of the insulating material, a known method may be generally appropriately used and not particularly limited. For example, the resin composition described above and various known additives or a solvent generally used for insulating materials are mixed with a known mixer to produce the insulating material. Incidentally, the method for adding each component during mixing is not particularly limited, and a generally known method may be appropriately applied.

<<Coating Material>>

The coating material of the present embodiment includes the resin composition of the present embodiment. As the production method of the coating material, a known method may be generally appropriately used and not particularly limited. For example, the resin composition described above and various known additives or a solvent generally used for coating materials are mixed with a known mixer to produce the coating material. Incidentally, the method for adding each component during mixing is not particularly limited, and a generally known method may be appropriately applied.

<<Fiber-Reinforced Composite Material>>

The fiber-reinforced composite material of the present embodiment includes a reinforcement fiber and the cured product of the resin composition of the present embodiment. Preferably, the fiber-reinforced composite material has a reinforcement fiber and a cured product including the reinforcement fiber to which the resin composition is applied (preferably, by impregnation or coating) and cured.

As the reinforcement fiber, a generally known one may be used without particular limitation. Specific examples thereof include a glass fiber such as E-glass, D-glass, L-glass, S-glass, T-glass, Q-glass, UN-glass, NE-glass and spherical glass, a carbon fiber, an aramid fiber, a boron fiber, a PBO fiber, a high-strength polyethylene fiber, an alumina fiber, and a silicon carbide fiber. The foam and arrangement of the reinforcement fiber is not particularly limited, and may be appropriately selected from a woven fabric, a nonwoven fabric, a mat, a knit, a braid, a unidirectional strand, a roving, and a chopped fiber. Alternatively, the reinforcement fiber may be famed into a preform (a laminate of knitted base cloth made of reinforcement fiber, a unification of knitted base cloth made of reinforcement fiber seamed with a stitch thread, or a structure of fiber such as three-dimensional fabric and braiding).

As the production method of the fiber-reinforced composite material, a known method may be generally appropriately used and not particularly limited. Specific examples thereof include liquid composite molding method, resin film infusion method, filament winding method, hand lay-up method, and pultrusion method. Among them, resin transfer molding method included in the liquid composite molding method allows materials other than a preform such as a metal plate, a foam core, and a honeycomb core to be pre-set in a foaming mold, being applicable to various uses and preferably used for mass production of a composite material having a relatively complicated shape for a short time.

EXAMPLES

The present invention is more specifically described with reference to Examples as follows. The material, the amount used, the proportion, the processing details, the processing procedure and the like shown in following Examples may be appropriately changed without deviation from the object of the present invention. Accordingly, the scope of the present invention is not limited to the following specific examples.

In the case where a measurement instrument for use in Examples are unavailable due to discontinued supply, measurement may be performed by using an instrument having other equivalent functions.

Synthesis Example 1: Synthesis of Cyanate Ester (SNCN)

In a reactor, 0.47 mol (in tams of OH group) of α-naphthol aralkyl-type phenol resin (product name: SN495V manufactured by NIPPON STEEL Chemical & Material Co., Ltd., OH group equivalent: 236 g/eq., number of naphthol aralkyl repeating unit n: 1 to 5) was dissolved in 500 mL of chloroform, and 0.7 mol of triethyl amine was added to the solution. While maintaining the temperature at −10° C., 300 g of chloroform solution of 0.93 mol of cyanogen chloride was dropped into the reactor over 1.5 hours, and after completion of the dropping, the mixture was stirred for 30 minutes. A mixture solution of 0.1 mol of triethyl amine and 30 g of chloroform was then further dropped into the reactor, and the mixture was stirred for 30 minutes to complete the reaction. After a by-produced hydrochloride of triethyl amine was filtered out from the reaction liquid, the resulting filtrate was washed with 500 mL of 0.1 N hydrochloric acid, and then washing with 500 mL of water was repeated four times. The washed filtrate was dried with sodium sulfate and evaporated at 75° C. and subjected to deaeration under reduced pressure at 90° C. to obtain an α-naphthol aralkyl-type cyanate ester resin (hereinafter, referred to as SNCN) in a brown solid faint. In analysis of infrared absorption spectrum of the resulting α-naphthol aralkyl-type cyanate ester resin, an absorption of cyanate ester group in the vicinity of 2264 $cm^{-1}$ was identified.

Synthesis Example 2: Synthesis of Cyanate Ester (P-2M)

In a reactor, 0.5 mol (in tams of OH group) of bisphenol M (manufactured by Mitsui Fine Chemicals, Inc., OH group equivalent: 173 g/eq.) was dissolved in 500 mL of chloroform, and 0.75 mol of triethyl amine was added to the solution. While maintaining the temperature at −10° C., 300 g of chloroform solution of 1.0 mol of cyanogen chloride was dropped into the reactor over 1.5 hours, and after completion of the dropping, the mixture was stirred for 30 minutes. A mixture solution of mol of triethyl amine and 30 g of chloroform was then further dropped into the reactor, and the mixture was stirred for 30 minutes to complete the reaction. After a by-produced hydrochloride of triethyl amine was filtered out from the reaction liquid, the resulting filtrate was washed with 500 mL of 0.1 N hydrochloric acid, and then washing with 500 mL of water was repeated four times. The washed filtrate was dried with sodium sulfate and evaporated at 75° C. and subjected to deaeration under reduced pressure at 90° C. to obtain a bis M-type cyanate ester resin (hereinafter, referred to as P-2M) in a pale yellow solid faint. In analysis of infrared absorption spectrum of the resulting bis M-type cyanate ester resin, absorptions of cyanate ester group in the vicinities of 2234 cm 1 and 2270 cm 1 were identified.

<Preparation of Composition>

Example 1

As the cyanate ester compound (A), 50 parts by mass of SNCN obtained in Synthesis Example 1 and 50 parts by mass of a bisphenol A-type cyanate ester (trade name: TA, manufactured by Mitsubishi Gas Chemical Co., Inc.), as the amine adduct compound (B), 1 part by mass of Ajicure PN-50 (manufactured by Ajinomoto Fine Techno Co., Inc., softening temperature: 110° C.), as the borate ester (C), 0.5 parts by mass of triethyl borate (manufactured by Tokyo Chemical Industry Co., Ltd.), and as the phenolic compound (D), 6 parts by mass of 4-nonyl phenol (manufactured by Tokyo Chemical Industry Co., Ltd.) were fed into a screw storage bottle, and the mixture was heated, stirred and mixed to obtain a composition.

Example 2

A composition was obtained in the same manner as in Example 1, except that 0.5 parts by mass of triphenyl borate (manufactured by Tokyo Chemical Industry Co., Ltd.) was used instead of using 0.5 parts by mass of triethyl borate in Example 1.

Example 3

A composition was obtained in the same manner as in Example 1, except that 1 part by mass of Ajicure MY-25 (manufactured by Ajinomoto Fine Techno Co., Inc., softening temperature: 130° C.) was used instead of using 1 part by mass of Ajicure PN-50 in Example 1.

Example 4

A composition was obtained in the same manner as in Example 3, except that 0.5 parts by mass of triphenyl borate was used instead of using 0.5 parts by mass of triethyl borate in Example 3.

Example 5

A composition was obtained in the same manner as in Example 1, except that 6 parts by mass of 2,4-dinonyl phenol (manufactured by Yokkaichi Chemical Co., Ltd.) was used instead of using 6 parts by mass of 4-nonyl phenol in Example 1.

Example 6

A composition was obtained in the same manner as in Example 1, except that 8 parts by mass of 4-nonyl phenol was used instead of using 6 parts by mass of 4-nonyl phenol in Example 1.

Example 7

A composition was obtained in the same manner as in Example 1, except that 10 parts by mass of 4-nonyl phenol was used instead of using 6 parts by mass of 4-nonyl phenol in Example 1.

Example 8

A composition was obtained in the same manner as in Example 1, except that 70 parts by mass of a prepolymer of bisphenol A-type cyanate ester (trade name: TA-1500, manufactured by Mitsubishi Gas Chemical Co., Inc.) and 30 parts by mass of TA were used instead of using 50 parts by mass of SNCN and 50 parts by mass of TA, 0.15 parts by mass of triethyl borate was used instead of using 0.5 parts by mass of triethyl borate, and 10 parts by mass of 4-nonyl phenol was used instead of using 6 parts by mass of 4-nonyl phenol, in Example 1.

Example 9

A composition was obtained in the same manner as in Example 8, except that 0.3 parts by mass of triethyl borate was used instead of using 0.15 parts by mass of triethyl borate in Example 8.

Example 10

A composition was obtained in the same manner as in Example 8, except that 0.5 parts by mass of triethyl borate was used instead of using 0.15 parts by mass of triethyl borate in Example 8.

Example 11

A composition was obtained in the same manner as in Example 8, except that 0.7 parts by mass of triethyl borate was used instead of using 0.15 parts by mass of triethyl borate in Example 8.

Example 12

A composition was obtained in the same manner as in Example 8, except that 0.9 parts by mass of triethyl borate was used instead of using 0.15 parts by mass of triethyl borate in Example 8.

Example 13

A composition was obtained in the same manner as in Example 8, except that 0.5 parts by mass of Ajicure PN-50 was used instead of using 1 part by mass of Ajicure PN-50, and 6 parts by mass of 4-nonyl phenol was used instead of using 10 parts by mass of 4-nonyl phenol in Example 8.

Example 14

A composition was obtained in the same manner as in Example 13, except that 1.5 parts by mass of Ajicure PN-50 was used instead of using 0.5 parts by mass of Ajicure PN-50, and 0.45 parts by mass of triethyl borate was used instead of using 0.15 parts by mass of triethyl borate in Example 13.

Example 15

A composition was obtained in the same manner as in Example 1, except that 25 parts by mass of a thermoplastic polyimide resin (trade name: Theiplim, manufactured by Mitsubishi Gas Chemical Co., Inc.) was added as the toughening agent (E) in Example 1.

Example 16

A composition was obtained in the same manner as in Example 1, except that 65 parts by mass of SNCN and 35 parts by mass of P-2M obtained in Synthesis Example 2 were used instead of using 50 parts by mass of SNCN and 50 parts by mass of TA in Example 1.

Example 17

A composition was obtained in the same manner as in Example 8, except that 90 parts by mass of a prepolymer of bisphenol A-type cyanate ester and 10 parts by mass of TA were used instead of using 70 parts by mass of a prepolymer of bisphenol A-type cyanate ester and 30 parts by mass of TA, 0.4 parts by mass of triethyl borate was used instead of using 0.15 parts by mass of triethyl borate, and 9 parts by mass of 4-nonyl phenol was used instead of using 10 parts by mass of 4-nonyl phenol in Example 8.

Example 18

A composition was obtained in the same manner as in Example 17, except that 85 parts by mass of a prepolymer of bisphenol A-type cyanate ester and 15 parts by mass of TA were used instead of using 90 parts by mass of a prepolymer of bisphenol A-type cyanate ester and 10 parts by mass of TA, and 20 parts by mass of Theiplim was added as the toughening agent (E) in Example 17.

Example 19

A composition was obtained in the same manner as in Example 18, except that 0.5 parts by mass of triethyl borate was used instead of using 0.4 parts by mass of triethyl borate in Example 18.

Example 20

A composition was obtained in the same manner as in Example 18, except that 0.6 parts by mass of triethyl borate was used instead of using 0.4 parts by mass of triethyl borate in Example 18.

Example 21

A composition was obtained in the same manner as in Example 18, except that 0.7 parts by mass of triethyl borate was used instead of using 0.4 parts by mass of triethyl borate in Example 18.

Example 22

A composition was obtained in the same manner as in Example 18, except that 1 part by mass of triethyl borate was used instead of using 0.4 parts by mass of triethyl borate in Example 18.

Example 23

A composition was obtained in the same manner as in Example 18, except that 20 parts by mass of a silicone composite powder (trade name: KMP-600, manufactured by Shin-Etsu Chemical Co., Ltd.) was used instead of using 20 parts by mass of Theiplim in Example 18.

Example 24

A composition was obtained in the same manner as in Example 18, except that 20 parts by mass of a silicone composite powder (trade name: KMP-601, manufactured by Shin-Etsu Chemical Co., Ltd.) was used instead of using 20 parts by mass of Theiplim in Example 18.

Example 25

A composition was obtained in the same manner as in Example 18, except that 20 parts by mass of a silicone composite powder (trade name: KMP-602, manufactured by Shin-Etsu Chemical Co., Ltd.) was used instead of using 20 parts by mass of Theiplim in Example 18.

Example 26

A composition was obtained in the same manner as in Example 18, except that 20 parts by mass of a silicone composite powder (trade name: KMP-605, manufactured by Shin-Etsu Chemical Co., Ltd.) was used instead of using 20 parts by mass of Theiplim in Example 18.

Comparative Example 1

A composition was obtained in the same manner as in Example 1, except that 0.5 parts by mass of triethyl borate was not used in Example 1.

Comparative Example 2

A composition was obtained in the same manner as in Example 3, except that 0.5 parts by mass of triethyl borate was not used in Example 3.

Comparative Example 3

A composition was obtained in the same manner as in Example 1, except that 1 part by mass of Ajicure PN-50 was not used in Example 1.

Comparative Example 4

A composition was obtained in the same manner as in Example 2, except that 1 part by mass of Ajicure PN-50 was not used in Example 2.

Comparative Example 5

A composition was obtained in the same manner as in Example 1, except that 1 part by mass of Ajicure PN-50, 0.5 parts by mass of triethyl borate and 6 parts by mass of 4-nonyl phenol were not used in Example 1.

Comparative Example 6

A composition was obtained in the same manner as in Example 1, except that 1 part by mass of Ajicure PN-50 and 0.5 parts by mass of triethyl borate were not used in Example 1.

Comparative Example 7

A composition was obtained in the same manner as in Example 8, except that 0.15 parts by mass of triethyl borate was not used in Example 8.

Comparative Example 8

A composition was obtained in the same manner as in Example 16, except that 0.5 parts by mass of triethyl borate was not used in Example 16.

Comparative Example 9

A composition was obtained in the same manner as in Comparative Example 8, except that 0.1 parts by mass of cobalt (III) acetylacetonate (manufactured by Tokyo Chemical Industry Co., Ltd.) was used instead of using 1 part by mass of Ajicure PN-50 in Comparative Example 8.

<Evaluation of Composition>

Each of the compositions obtained as described above was subjected to evaluation of properties based on the following criteria.

(1) Viscosity

The viscosity (unit: Pas) of each composition at 80° C. was measured by using a dynamic viscoelasticity tester.

As the dynamic viscoelasticity tester, Discovery HR-2, manufactured by TA Instruments was used.

(2) Stability

By using a dynamic viscoelasticity tester, the viscosity of each composition held at 80° C. for 60 minutes was measured. The relative viscosity after 60 minutes from the initiation of the test was calculated relative to 100 of viscosity before the initiation of the test for evaluation of stability.

As the dynamic viscoelasticity tester, Discovery HR-2, manufactured by TA Instruments was used.

(3) Curability

In observation of exothermic behavior of each composition using a differential scanning calorimeter under measurement conditions at an initial temperature of 40° C., a termination temperature of 380° C., and a heating rate of 3° C./minute, the peak top temperature (unit: ° C.) was determined to evaluate curability.

As the differential scanning calorimeter, DSC7020 manufactured by SII NanoTechnology Inc. was used.

(4) Heat Resistance of Cured Product

About 6 g of each composition obtained as described above was weighed in an aluminum cup, heated at 135° C. for 8 hours and then at 177° C. for 4 hours in a curing furnace to obtain a cured product.

The storage modulus G' of the resulting cured product was measured by a DMA method according to JIS C6481 with a dynamic viscoelasticity tester. The onset value was defined as glass transition temperature (Tg, unit: ° C.) for evaluation of the heat resistance of the cured product.

As the dynamic viscoelasticity tester, Discovery HR-2, manufactured by TA Instruments was used.

TABLE 1

| | | | | Example 1 | Example 2 | Example 3 | Example 4 | Example 5 | Example 6 | Example 7 |
|---|---|---|---|---|---|---|---|---|---|---|
| Component (A) | Cyanate ester | SNCN | part by mass | 50 | 50 | 50 | 50 | 50 | 50 | 50 |
| | | TA | part by mass | 50 | 50 | 50 | 50 | 50 | 50 | 50 |
| | | TA-1500 | part by mass | | | | | | | |
| | | P-2M | part by mass | | | | | | | |
| Component (B) | Amine adduct | Ajicure PN-50 | part by mass | 1 | 1 | | | 1 | 1 | |
| | | Ajicure MY-25 | part by mass | | | 1 | 1 | | | |
| Component (C) | Borate ester | Triethyl borate | part by mass | 0.5 | | 0.5 | | 0.5 | 0.5 | 0.5 |
| | | Triphenyl borate | part by mass | | 0.5 | | 0.5 | | | |
| Component (D) | Phenolic compound | 4-Nonyl phenol | part by mass | 6 | 6 | 6 | 6 | | 8 | 10 |
| | | 2,4-Dinonyl phenol | part by mass | | | | | 6 | | |
| Component (E) | Toughening agent | Therplim | part by mass | | | | | | | |
| | | KMP-600 | part by mass | | | | | | | |
| | | KMP-601 | part by mass | | | | | | | |
| | | KMP-602 | part by mass | | | | | | | |
| | | KMP-605 | part by mass | | | | | | | |
| Other component | | Cobalt (III) acetylacetonate | part by mass | | | | | | | |
| Evaluation of physical properties | | | | | | | | | | |
| Viscosity | Viscosity (80° C.) | | Pa · s | 0.22 | 0.18 | 0.17 | 0.18 | 0.22 | 0.17 | 0.14 |
| Stability | Relative viscosity (60 min@80° C.) | | | 112 | 107 | 113 | 105 | 114 | 114 | 113 |
| Curability | DSC peak top | | ° C. | 153 | 156 | 163 | 163 | 182 | 155 | 143 |
| Heat resistance of cured product | Tg (G'), curing at 177° C. | | ° C. | 209 | 209 | 207 | 208 | 207 | 205 | 207 |

TABLE 2

| | | | | Example 8 | Example 9 | Example 10 | Example 11 | Example 12 |
|---|---|---|---|---|---|---|---|---|
| Component (A) | Cyanate ester | SNCN | part by mass | | | | | |
| | | TA | part by mass | 30 | 30 | 30 | 30 | 30 |
| | | TA-1500 | part by mass | 70 | 70 | 70 | 70 | 70 |
| | | P-2M | part by mass | | | | | |
| Component (B) | Amine adduct | Ajicure PN-50 | part by mass | 1 | 1 | 1 | 1 | 1 |
| | | Ajicure MY-25 | part by mass | | | | | |
| Component (C) | Borate ester | Triethyl borate | part by mass | 0.15 | 0.3 | 0.5 | 0.7 | 0.9 |
| | | Triphenyl borate | part by mass | | | | | |
| Component (D) | Phenolic compound | 4-Nonyl phenol | part by mass | 10 | 10 | 10 | 10 | 10 |
| | | 2,4-Dinonyl phenol | part by mass | | | | | |
| Component (E) | Toughening agent | Therplim | part by mass | | | | | |
| | | KMP-600 | part by mass | | | | | |
| | | KMP-601 | part by mass | | | | | |
| | | KMP-602 | part by mass | | | | | |
| | | KMP-605 | part by mass | | | | | |
| Other component | | Cobalt (III) acetylacetonate | part by mass | | | | | |
| Evaluation of physical properties | | | | | | | | |
| Viscosity | Viscosity (80° C.) | | Pa · s | 1.1 | 1.0 | 0.85 | 0.90 | 0.86 |
| Stability | Relative viscosity (60 min@80° C.) | | | 105 | 105 | 111 | 112 | 117 |
| Curability | DSC peak top | | ° C. | 141 | 148 | 174 | 151 | 151 |
| Heat resistance of cured product | Tg (G'), curing at 177° C. | | ° C. | 200 | 201 | 207 | 205 | 205 |

TABLE 3

| | | | | Example 13 | Example 14 | Example 15 | Example 16 | Example 17 | Example 18 |
|---|---|---|---|---|---|---|---|---|---|
| Component (A) | Cyanate ester | SNCN | part by mass | | | 50 | 65 | | |
| | | TA | part by mass | 30 | 30 | 50 | | 10 | 15 |
| | | TA-1500 | part by mass | 70 | 70 | | | 90 | 85 |
| | | P-2M | part by mass | | | | 35 | | |
| Component (B) | Amine adduct | Ajicure PN-50 | part by mass | 0.5 | 1.5 | 1 | 1 | 1 | 1 |
| | | Ajicure MY-25 | part by mass | | | | | | |

TABLE 3-continued

| | | | | Example 13 | Example 14 | Example 15 | Example 16 | Example 17 | Example 18 |
|---|---|---|---|---|---|---|---|---|---|
| Component (C) | Borate ester | Triethyl borate | part by mass | 0.15 | 0.45 | 0.5 | 0.5 | 0.4 | 0.4 |
| | | Triphenyl borate | part by mass | | | | | | |
| Component (D) | Phenolic compound | 4-Nonyl phenol | part by mass | 6 | 6 | 6 | 6 | 9 | 9 |
| | | 2,4-Dinonyl phenol | part by mass | | | | | | |
| Component (E) | Toughening agent | Therplim | part by mass | | | 25 | | | 20 |
| | | KMP-600 | part by mass | | | | | | |
| | | KMP-601 | part by mass | | | | | | |
| | | KMP-602 | part by mass | | | | | | |
| | | KMP-605 | part by mass | | | | | | |
| Other component | | Cobalt (III) acetylacetonate | part by mass | | | | | | |
| Evaluation of physical properties | | | | | | | | | |
| Viscosity | Viscosity (80° C.) | | Pa · s | 1.2 | 1.2 | 0.49 | 3.9 | 6.6 | 6.8 |
| Stability | Relative viscosity (60 min@80° C.) | | | 111 | 113 | 118 | 111 | 107 | 112 |
| Curability | DSC peak top | | ° C. | 176 | 160 | 173 | 169 | 147 | 144 |
| Heat resistance of cured product | Tg (G'), curing at 177° C. | | ° C. | 209 | 208 | 204 | 185 | 199 | 197 |

TABLE 4

| | | | | Example 19 | Example 20 | Example 21 | Example 22 | Example 23 |
|---|---|---|---|---|---|---|---|---|
| Component (A) | Cyanate ester | SNCN | part by mass | | | | | |
| | | TA | part by mass | 15 | 15 | 15 | 15 | 15 |
| | | TA-1500 | part by mass | 85 | 85 | 85 | 85 | 85 |
| | | P-2M | part by mass | | | | | |
| Component (B) | Amine adduct | Ajicure PN-50 | part by mass | 1 | 1 | 1 | 1 | 1 |
| | | Ajicure MY-25 | part by mass | | | | | |
| Component (C) | Borate ester | Triethyl borate | part by mass | 0.5 | 0.6 | 0.7 | 1 | 0.4 |
| | | Triphenyl borate | part by mass | | | | | |
| Component (D) | Phenolic compound | 4-Nonyl phenol | part by mass | 9 | 9 | 9 | 9 | 9 |
| | | 2,4-Dinonyl phenol | part by mass | | | | | |
| Component (E) | Toughening agent | Therplim | part by mass | 20 | 20 | 20 | 20 | |
| | | KMP-600 | part by mass | | | | | 20 |
| | | KMP-601 | part by mass | | | | | |
| | | KMP-602 | part by mass | | | | | |
| | | KMP-605 | part by mass | | | | | |
| Other component | | Cobalt (III) acetylacetonate | part by mass | | | | | |
| Evaluation of physical properties | | | | | | | | |
| Viscosity | Viscosity (80° C.) | | Pa · s | 7.0 | 7.0 | 6.4 | 6.8 | 5.9 |
| Stability | Relative viscosity (60 min@80° C.) | | | 114 | 111 | 123 | 121 | 108 |
| Curability | DSC peak top | | ° C. | 147 | 148 | 154 | 150 | 141 |
| Heat resistance of cured product | Tg (G'), curing at 177° C. | | ° C. | 192 | 202 | 200 | 199 | 195 |

| | | | | Example 24 | Example 25 | Example 26 |
|---|---|---|---|---|---|---|
| Component (A) | Cyanate ester | SNCN | part by mass | | | |
| | | TA | part by mass | 15 | 15 | 15 |
| | | TA-1500 | part by mass | 85 | 85 | 85 |
| | | P-2M | part by mass | | | |
| Component (B) | Amine adduct | Ajicure PN-50 | part by mass | 1 | 1 | 1 |
| | | Ajicure MY-25 | part by mass | | | |
| Component (C) | Borate ester | Triethyl borate | part by mass | 0.4 | 0.4 | 0.4 |
| | | Triphenyl borate | part by mass | | | |
| Component (D) | Phenolic compound | 4-Nonyl phenol | part by mass | 9 | 9 | 9 |
| | | 2,4-Dinonyl phenol | part by mass | | | |
| Component (E) | Toughening agent | Therplim | part by mass | | | |
| | | KMP-600 | part by mass | | | |
| | | KMP-601 | part by mass | 20 | | |
| | | KMP-602 | part by mass | | 20 | |
| | | KMP-605 | part by mass | | | 20 |
| Other component | | Cobalt (III) acetylacetonate | part by mass | | | |
| Evaluation of physical properties | | | | | | |

TABLE 4-continued

| | | | | | |
|---|---|---|---|---|---|
| Viscosity | Viscosity (80° C.) | Pa · s | 5.5 | 6.0 | 5.0 |
| Stability | Relative viscosity (60 min@80° C.) | | 120 | 116 | 124 |
| Curability | DSC peak top | ° C. | 145 | 150 | 143 |
| Heat resistance of cured product | Tg (G'), curing at 177° C. | ° C. | 199 | 194 | 203 |

TABLE 5

| | | | | Comparative Example 1 | Comparative Example 2 | Comparative Example 3 | Comparative Example 4 | Comparative Example 5 |
|---|---|---|---|---|---|---|---|---|
| Component (A) | Cyanate ester | SNCN | part by mass | 50 | 50 | 50 | 50 | 50 |
| | | TA | part by mass | 50 | 50 | 50 | 50 | 50 |
| | | TA-1500 | part by mass | | | | | |
| | | P-2M | part by mass | | | | | |
| Component (B) | Amine adduct | Ajicure PN-50 | part by mass | 1 | | | | |
| | | Ajicure MY-25 | part by mass | | 1 | | | |
| Component (C) | Borate ester | Triethyl borate | part by mass | | | 0.5 | | |
| | | Triphenyl borate | part by mass | | | | 0.5 | |
| Component (D) | Phenolic compound | 4-Nonyl phenol | part by mass | 6 | 6 | 6 | 6 | |
| | | 2,4-Dinonyl phenol | part by mass | | | | | |
| Component (E) | Toughening agent | Therplim | part by mass | | | | | |
| | | KMP-600 | part by mass | | | | | |
| | | KMP-601 | part by mass | | | | | |
| | | KMP-602 | part by mass | | | | | |
| | | KMP-605 | part by mass | | | | | |
| Other component | | Cobalt (III) acetylacetonate | part by mass | | | | | |
| Evaluation of physical properties | | | | | | | | |
| Viscosity | Viscosity (80° C.) | | Pa · s | 0.75 | 0.87 | 0.21 | 0.20 | 0.26 |
| Stability | Relative viscosity (60 min@80° C.) | | | 3382 | 1755 | 117 | 108 | 106 |
| Curability | DSC peak top | | ° C. | 162 | 161 | 200 | 200 | 230 |
| Heat resistance of cured product | Tg (G'), curing at 177° C. | | ° C. | 206 | 214 | 205 | 187 | 214 |

TABLE 6

| | | | | Comparative Example 6 | Comparative Example 7 | Comparative Example 8 | Comparative Example 9 |
|---|---|---|---|---|---|---|---|
| Component (A) | Cyanate ester | SNCN | part by mass | 50 | | 65 | 65 |
| | | TA | part by mass | 50 | 30 | | |
| | | TA-1500 | part by mass | | 70 | | |
| | | P-2M | part by mass | | | 35 | 35 |
| Component (B) | Amine adduct | Ajicure PN-50 | part by mass | | 1 | 1 | |
| | | Ajicure MY-25 | part by mass | | | | |
| Component (C) | Borate ester | Triethyl borate | part by mass | | | | |
| | | Triphenyl borate | part by mass | | | | |
| Component (D) | Phenolic compound | 4-Nonyl phenol | part by mass | 6 | 10 | 6 | 6 |
| | | 2,4-Dinonyl phenol | part by mass | | | | |
| Component (E) | Toughening agent | Therplim | part by mass | | | | |
| | | KMP-600 | part by mass | | | | |
| | | KMP-601 | part by mass | | | | |
| | | KMP-602 | part by mass | | | | |
| | | KMP-605 | part by mass | | | | |
| Other component | | Cobalt (III) acetylacetonate | part by mass | | | | 0.1 |
| Evaluation of physical properties | | | | | | | |
| Viscosity | Viscosity (80° C.) | | Pa · s | 0.17 | 3.3 | 8.4 | 0.12 |
| Stability | Relative viscosity (60 min@80° C.) | | | 107 | 1007 | 1650 | 190 |
| Curability | DSC peak top | | ° C. | 219 | 148 | 166 | 171 |
| Heat resistance of cured product | Tg (G'), curing at 177° C. | | ° C. | 209 | 196 | 188 | 217 |

As shown in Tables 1 to 6, it has been confirmed that the resin composition comprising a cyanate ester compound (A), an amine adduct (B) and a borate ester (C) of the present invention has stability and curability, and the cured product thereof has excellent heat resistance (high glass transition temperature).

What is claimed is:

1. A resin composition comprising a cyanate ester compound (A), an amine adduct compound (B), and a borate ester (C), the resin composition having a mass ratio between the amine adduct compound (B) and the borate ester (C) ((B)/(C)) of 0.5 or more and 10.0 or less, wherein the borate ester (C) includes the following compound (C)

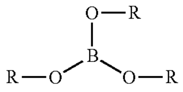

wherein each R independently represents a hydrocarbon group having 1 to 20 carbon atoms, which optionally has a substituent, and one or two or more oxygen atoms may be included in the hydrocarbon group, wherein the substituent is a hydroxy group, an amino group or a carboxy group.

2. The resin composition according to claim 1, wherein the cyanate ester compound (A) comprises at least one selected from the group consisting of a compound represented by the following formula (I) and a compound represented by the following formula (II):

(I)

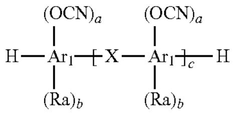

wherein each of $Ar_1$ independently represents an aromatic ring, each of Ra independently represents any one of a hydrogen atom, an alkyl group having 1 to 6 carbon atoms, an alkenyl group having 2 to 6 carbon atoms, an aryl group having 6 to 12 carbon atoms and an alkoxy group having 1 to 4 carbon atoms, the alkyl group or the aryl group in Ra optionally has a substituent, a represents the number of cyanate groups bonded to $Ar_1$, being each independently an integer of 1 to 3, b represents the number of Ra bonded to $Ar_1$, being each independently a number obtained by subtracting (a+2) from the number of substitutable substituents of $Ar_1$, c is an integer of 1 to 50, each of X independently represents any one of a single bond, a divalent organic group having 1 to 50 carbon atoms, a sulfonyl group (—$SO_2$—), a divalent sulfur atom (—S—), and a divalent oxygen atom (—O—):

(II)

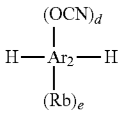

wherein $Ar_2$ represents an aromatic ring, each of Rb independently represents any one of a hydrogen atom, an alkyl group having 1 to 6 carbon atoms, an aryl group having 6 to 12 carbon atoms, and an alkoxy group having 1 to 4 carbon atoms, the alkyl group or aryl group in Rb optionally has a substituent, d represents the number of cyanate groups bonded to $Ar_2$, being an integer of 2 to 3, and e represents the number of Rb bonded to $Ar_2$, being a number obtained by subtracting (d+2) from the number of substitutable substituents of $Ar_2$.

3. The resin composition according to claim 2, wherein each of X independently represents a divalent linking group selected from the group consisting of the following formulas (III) to (XIV):

(III)

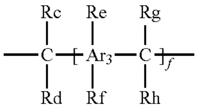

wherein each of $Ar_3$ independently represents an aromatic ring, each of Rc, Rd, Rg and Rh independently represents a hydrogen atom, an alkyl group having 1 to 6 carbon atoms, or an aryl group having 6 to 12 carbon atoms, the alkyl group or the aryl group in Rc, Rd, Rg and Rh optionally has a substituent, each of Re and Rf independently represents any one of a hydrogen atom, an alkyl group having 1 to 6 carbon atoms, an aryl group having 6 to 12 carbon atoms and an alkoxy group having 1 to 4 carbon atoms, the alkyl group or the aryl group in Re and Rf optionally has a substituent, and f represents an integer of 0 to 5;

(IV)

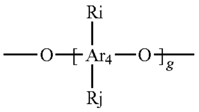

wherein each of $Ar_4$ independently represents an aromatic ring, each of Ri and Rj independently represents any one of a hydrogen atom, an alkyl group having 1 to 6 carbon atoms, an aryl group having 6 to 12 carbon atoms, and an alkoxy group having 1 to 4 carbon atoms, the alkyl group or aryl group in Ri and Rj optionally has a substituent, and g represents an integer of 0 to 5;

—O— (V)

(VI)

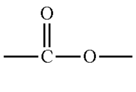

—S— (VII)

(VIII)

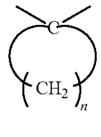

-continued (IX)

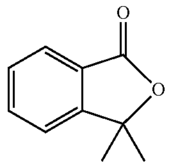

(X)

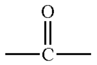

(XI)

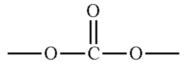

(XII)

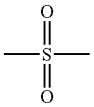

(XIII)

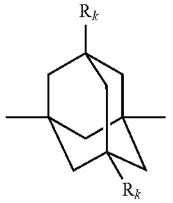

(XIV)

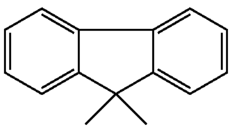

wherein h represents an integer of 4 to 7, and each of Rk independently represents a hydrogen atom or an alkyl group having 1 to 6 carbon atoms.

4. The resin composition according to claim 1, wherein the cyanate ester compound (A) comprises at least one or more selected from the group consisting of a compound represented by the following formula (XV) and a compound represented by the following formula (XVI):

(XV)

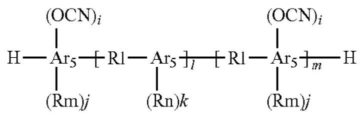

wherein each of $Ar_5$ independently represents an aromatic ring, each of Rl independently represents a methylene group, a methyleneoxy group, a methylene oxymethylene group, an oxymethylene group, or a group in which these two or more are bonded to each other, each of Rm and Rn independently represents a hydrogen atom, an alkyl group having 1 to 6 carbon atoms, an aryl group having 6 to 12 carbon atoms, or an alkoxy group having 1 to 4 carbon atoms, the alkyl group or the aryl group in Rm and Rn optionally has a substituent, i represents the number of cyanate groups bonded to $Ar_5$, being an integer of 1 to 3, j represents the number of Rm bonded to $Ar_5$, being a number obtained by subtracting (i+2) from the number of substitutable substituents of $Ar_5$, k represents the number of Rn bonded to $Ar_5$, being a number obtained by subtracting 2 from the number of substitutable substituents of $Ar_5$, 1 represents an integer of 1 or more, m represents an integer of 1 or more, and the arrangement of the repeating units is optional;

(XVI)

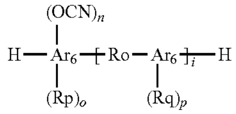

wherein each of $Ar_6$ independently represents an aromatic ring, each of Ro independently represents a methylene group, a methyleneoxy group, a methylene oxymethylene group, an oxymethylene group, or a group in which these are bonded to each other, each of Rp and Rq independently represents a hydrogen atom, an alkyl group having 1 to 6 carbon atoms, an aryl group having 6 to 12 carbon atoms, or an alkoxy group having 1 to 4 carbon atoms, the alkyl group or the aryl group in Rp and Rq optionally has a substituent, n represents the number of cyanate groups bonded to $Ar_6$, being an integer of 2 to 3, o represents the number of Rp bonded to $Ar_6$, being a number obtained by subtracting (n+2) from the number of substitutable substituents of $Ar_6$, p represents the number of Rq bonded to $Ar_6$, being a number obtained by subtracting 2 from the number of substitutable substituents of $Ar_6$, and q represents an integer of 1 or more.

5. The resin composition according to claim 1, wherein the content of the amine adduct compound (B) is 0.01 to 30 parts by mass relative to 100 parts by mass of the cyanate ester compound (A).

6. The resin composition according to claim 1, wherein the content of the borate ester (C) is 0.01 to 15 parts by mass relative to 100 parts by mass of the cyanate ester compound (A).

7. The resin composition according to claim 1, further comprising a phenolic compound (D).

8. The resin composition according to claim 7, wherein the content of the phenolic compound (D) is 1 to 20 parts by mass relative to 100 parts by mass of the cyanate ester compound (A).

9. The resin composition according to claim 1, further comprising a toughening agent (E).

10. The resin composition according to claim 9, wherein the toughening agent (E) comprises a thermoplastic resin.

11. The resin composition according to claim 9, wherein the toughening agent (E) comprises a resin in powder form.

12. The resin composition according to claim 9, wherein the content of the toughening agent (E) is 1 to 40 parts by mass relative to 100 parts by mass of the cyanate ester compound (A).

13. The resin composition according to claim 1, wherein the content of the amine adduct compound (B) is 0.01 to 30 parts by mass relative to 100 parts by mass of the cyanate ester compound (A), wherein the content of the borate ester (C) is 0.01 to 15 parts by mass relative to 100 parts by mass of the cyanate ester compound (A), wherein the resin composition further comprises a phenolic compound (D), wherein the content of the phenolic compound (D) is 1 to 20 parts by mass relative to 100 parts by mass of the cyanate ester compound (A).

14. The resin composition according to claim 13, further comprising a toughening agent (E), wherein the content of the toughening agent (E) is 1 to 40 parts by mass relative to 100 parts by mass of the cyanate ester compound (A).

15. A cured product of the resin composition according to claim 1.

16. A sealing material comprising the resin composition according to claim 1.

17. An adhesive comprising the resin composition according to claim 1.

18. An insulating material comprising the resin composition according to claim 1.

19. A coating material comprising the resin composition according to claim 1.

20. A prepreg formed from a base material and the resin composition according to claim 1.

21. A multilayered body formed from the prepreg according to claim 20.

22. A fiber-reinforced composite material comprising a reinforcement fiber and a cured product of the resin composition according to claim 1.

23. The rein composition according to claim 1, wherein the mass ration between the amine adduct compound (B) and the borate ester (C) ((B)/(C)) is 0.5 or more and 5.0 or less.

24. The resin composition according to claim 7 wherein the phenolic compound (D) is nonyl phenol and/or dinonyl phenol.

* * * * *